US006155765A

United States Patent [19]

Warnix et al.

[11] Patent Number: 6,155,765

[45] Date of Patent: Dec. 5, 2000

[54] BULK LOADER

[76] Inventors: Bruce J. Warnix, 411 Idlewood Dr., Kannapolis, N.C. 28203; Sam H. McAllister, 954 Gilling Ct., Kannapolis, N.C. 28081

[21] Appl. No.: 09/230,242

[22] PCT Filed: Aug. 8, 1997

[86] PCT No.: PCT/US97/13993

§ 371 Date: Jan. 21, 1999

§ 102(e) Date: Jan. 21, 1999

[87] PCT Pub. No.: WO98/06990

PCT Pub. Date: Feb. 19, 1998

Related U.S. Application Data

[60] Provisional application No. 60/024,153, Aug. 9, 1996.

[51] Int. Cl.[7] .................................................... B65G 65/34

[52] U.S. Cl. .......................... 414/192; 414/207; 414/421; 373/81

[58] Field of Search .................................... 414/207, 192, 414/182, 421; 373/79, 80, 81, 82

[56] References Cited

U.S. PATENT DOCUMENTS

| | | | |
|---|---|---|---|
| 2,565,792 | 8/1951 | Wagner et al. . | |
| 3,069,030 | 12/1962 | Schellentrager | 414/192 |
| 3,146,901 | 9/1964 | McDowell et al. | 414/192 |
| 3,777,920 | 12/1973 | Wiese | 414/421 |
| 4,729,549 | 3/1988 | Lonardi et al. | 414/207 |

FOREIGN PATENT DOCUMENTS

| | | |
|---|---|---|
| 440845 | 2/1927 | Germany . |
| 1458844 | 1/1969 | Germany . |
| 735529 | 5/1980 | U.S.S.R. . |
| 1220820 | 1/1971 | United Kingdom . |

*Primary Examiner*—Thomas J. Brahan
*Attorney, Agent, or Firm*—Dougherty & Clements LLP

[57] ABSTRACT

The present invention is a bulk loader apparatus for providing bulk material through an open roof of an electric arc furnace. The bulk loader apparatus is a base, a swing arm pivotally connected to the base, a swing cradle pivotally connected to an upper region of the swing arm, and a hopper positionable in the swing cradle. In operation, a hydraulic cylinder mounted on the base and connected to the swing arm moves the swing arm from a standby position where a full hopper is positioned in the swing cradle to a charging position where the contents of the hopper are emptied into the electric arc furnace. In a preferred embodiment of the present invention, a wire and pulley assembly is also included to reduce the distance the swing arm must be rotated to empty the bulk material from the hopper. In another embodiment of the present invention, the swing arm is mounted on a turret which rotates the swing arm between the standby position and one or more charging positions. A method for charging an electric arc furnace with bulk material is also disclosed. The present invention significantly reduces the operating costs and the environmental impact of the metal refining process by efficiently supplying bulk material to the electric arc furnace.

18 Claims, 4 Drawing Sheets

BULK LOADER

This application claim benefit to provisional application 60/024,153 and filing date Aug. 9, 1996.

FIELD OF THE INVENTION

The present invention relates to an apparatus for loading bulk material into an electric arc furnace. More particularly, this invention relates to a bulk material loader that quickly and efficiently delivers bulk material through an open roof of an electric arc furnace thereby decreasing metal refining processing time.

BACKGROUND OF THE INVENTION

Bulk material, such as lime, carbon, slag formers, alloying elements, and the like, are rapidly charged in an electric arc furnace (EAF). Bulk material are delivered to the EAF through an open furnace roof. Preferably, the charging of the bulk material occurs during the period in which the furnace roof is open and receiving the scrap metals. The amount of time during which the roof is open, however, should be held to a minimum in order to minimize the amount of heat lost by the furnace and to decrease the production time.

Needs exist for a bulk material loader that allows a large quantity of non-scrap bulk material to be charged in a short period of time.

One type of existing material loading equipment for loading bulk material into an EAF utilizes a scrap charging bucket. The scrap charging bucket carries both scrap and bulk material. Consequently, use of the scrap charging bucket causes the bulk material to be charged simultaneously with the scrap. Use of the scrap charging bucket has numerous drawbacks. When the bulk material is charged along with the scrap, some of the bulk material is carried away with the thermal flow of furnace off-gases. This loss of bulk material decreases the amount of material available for the metal melting and refining process. It also increases the particulate material that must be removed and treated by associated environmental pollution equipment and increases the amount of fugitive particles entering the shop environment.

Another type of existing material loading equipment for loading bulk material into an EAF utilizes large sacks that are carried to the furnace and emptied through an open roof of the furnace. This process has numerous drawbacks. For example, this process requires that the furnace roof be opened for an extended period of time which raises numerous environmental concerns. Also, this process often requires that multiple sacks be used. This leads to an increase in furnace downtime since the material handling equipment must discard the remains of the used sack before retrieving another sack. Finally, the use of sacks is expensive.

Other existing bulk material loading equipment requires that a slag door be opened and that the bulk material be charged through the slag door opening. When the bulk material is charged through the slag doorway, the slag door must be kept open. As a consequence, this procedure allows excessive infiltration of ambient air which results in an undesirable decrease in the internal temperature of the furnace. Furthermore, the excessive infiltration of ambient air into the furnace resulting from this procedure decreases the efficiency of the air/gas pollution control equipment.

SUMMARY OF THE INVENTION

The invented bulk material loading apparatus can be utilized on any electric arc furnace having a roof which can be opened, rotated or moved a sufficient distance to allow enough clearance for bulk material to be charged into the furnace.

The invented apparatus has a swing arm pivotally mounted on a base. The swing arm rotates between a standby position and a charging position. In a preferred embodiment, a hydraulic cylinder controls the movement of the swing arm. The hydraulic cylinder is secured to the base and connected to a central region of the swing arm.

In alternative embodiments of the present invention, other sources of energy, either kinetic or potential, can be utilized to power the swing arm. Those other sources of energy include, but are not limited to, a motor and gear reducer combination, rack and pinion gearing, power screws, winches employing flexible mechanical components such as wire ropes or chains, and the use of counterweights with any type of energy source.

In the standby position, bulk material is loaded into a triangular hopper which is mounted in a swing cradle pivotally attached to a top region of the swing arm. The triangular hopper is positioned with the apex of the triangle near the swing cradle yoke. The side of the triangle furthest from the swing arm is oriented nearly parallel to the swing arm. The side of the triangle closest to the swing arm is angled upwardly toward the swing arm. Both sides of the triangle extend to a plane perpendicular to the swing arm thereby forming an opening.

The hydraulic cylinder rotates the swing arm to a nearly horizontal charging position where the swing cradle is positioned over the open roof of an EAF.

While the swing arm is moved over the furnace, a wire and pulley assembly connecting the swing cradle and the base tilts the swing cradle to allow the bulk material to fall out of the hopper. The wire and pulley assembly decreases the angle at which the swing arm must be rotated in order to completely empty the hopper. Alternatives to the wire and pulley assembly are foreseen and are compatible with the present invention. For example, alternatives to the static line include, but are not limited to, wire ropes or chain arrangements. In addition, means other than offset pulleys can be utilized to perform the static line function.

From the foregoing it is readily apparent that the present invention is a bulk material loader for charging bulk material into an EAF having a removable roof, which operates faster and more accurately than existing loaders.

OBJECTS OF THE INVENTION

The principal object of the invention to provide a bulk loader for an EAF furnace which will minimize furnace downtime and improve furnace and plant efficiency.

A further object of the present invention is to provide means for increasing the utilization of bulk material in a metal refining furnace by minimizing bulk material losses.

Another object of the present invention is to provide means for reducing loading dependency on regular material handling equipment which will free the material handling equipment to pursue other shop activities.

Another object of the present invention is to provide an improved material charging process which will reduce bulk material costs by eliminating the need for bagging bulk material.

A further object of the present invention is to provide an improved material charging process which will reduce shop environment contamination caused by fugitive particles.

Another object of the present invention is to provide an improved material charging process which will reduce demand on pollution control equipment.

A further object of the present invention is to improve the metal refining process by providing means for charging the furnace with the proper amount of bulk material, without wastage.

BRIEF DESCRIPTION OF THE DRAWINGS

The foregoing and other objects will become more readily apparent by referring to the following detailed description and the appended drawings in which.

DETAILED DESCRIPTION

Figure 1:
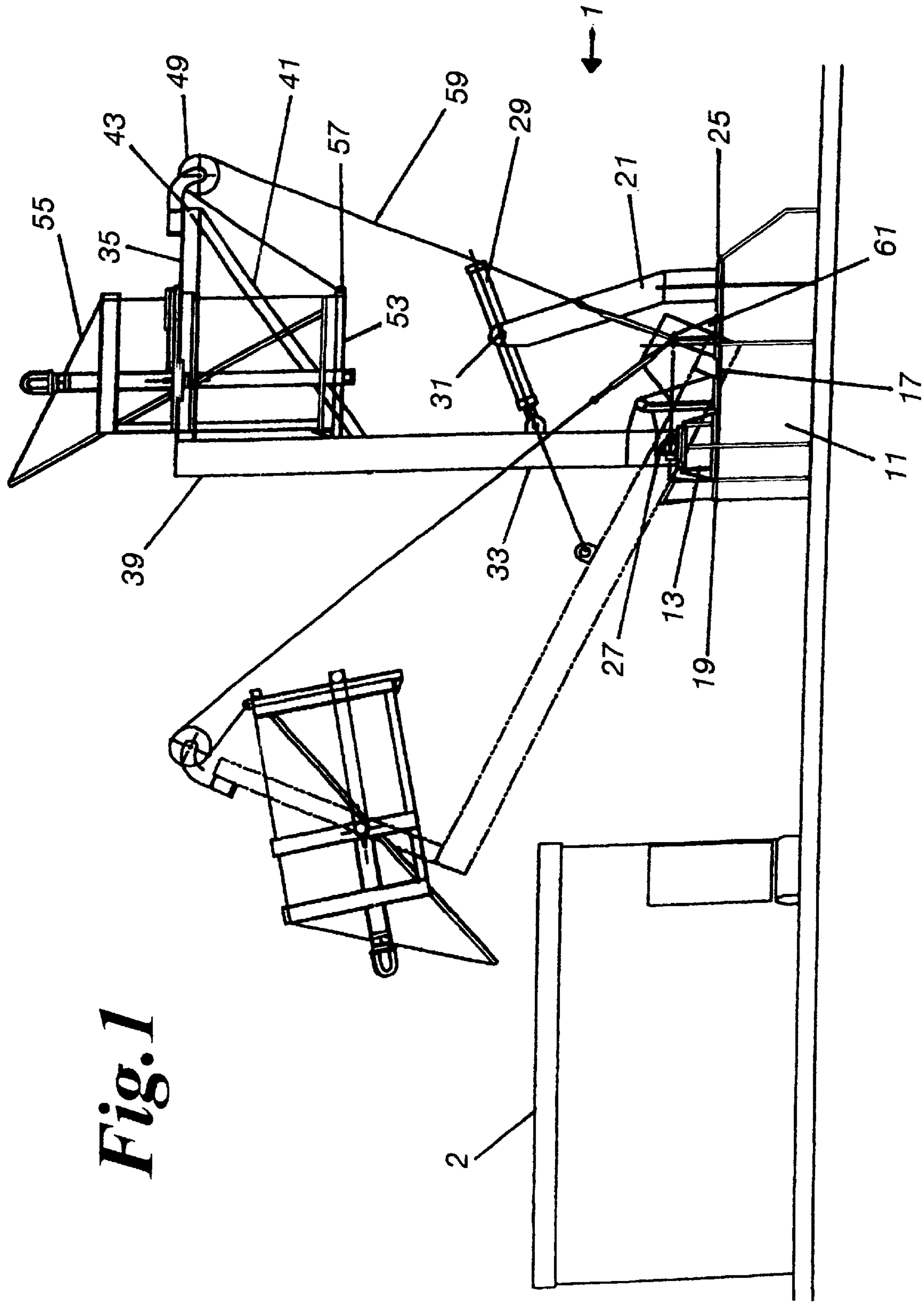
FIG. 1 is a side elevation view of the invented bulk loader in a standby position and in a charging position over an electric arc furnace.
Figure 2:
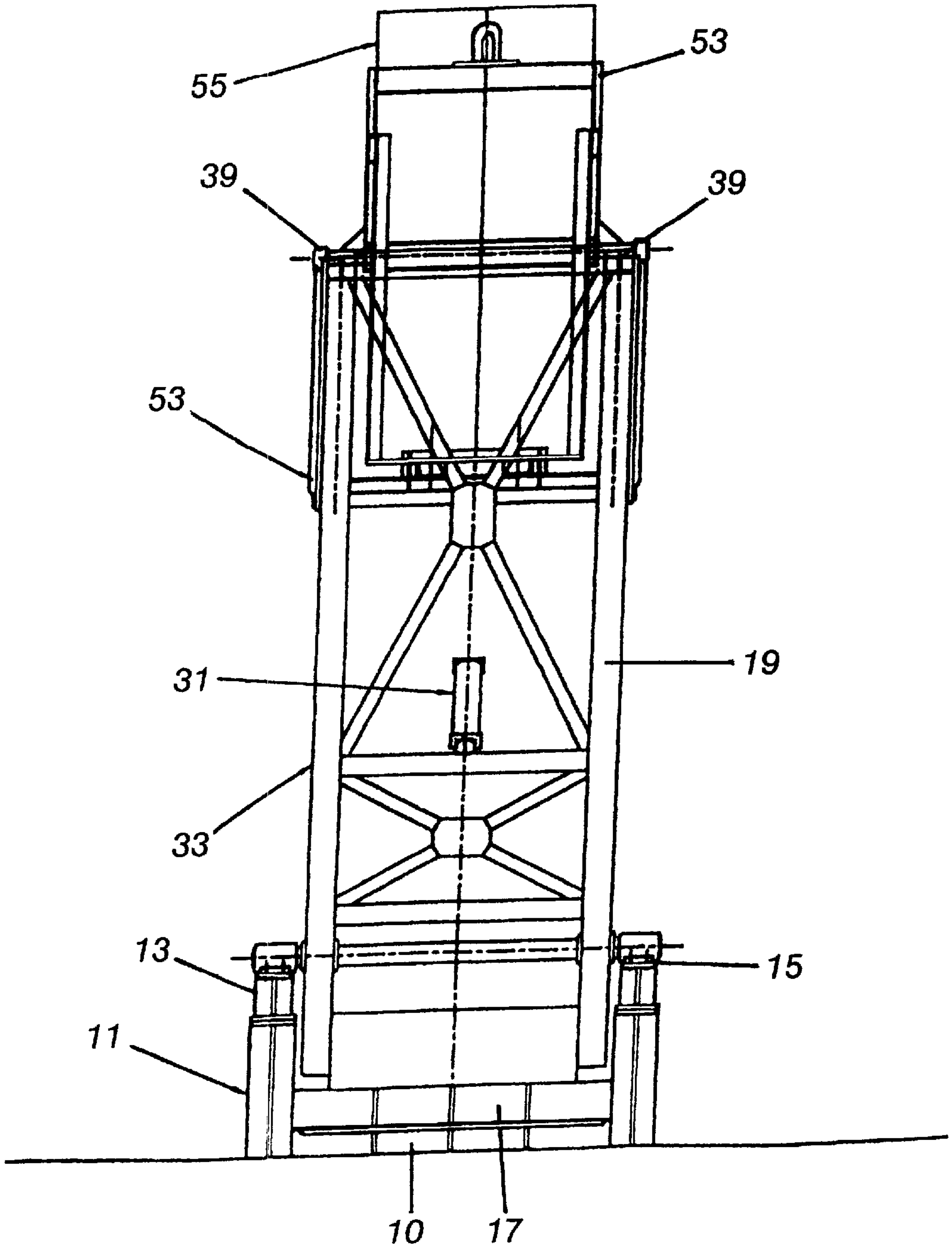
FIG. 2 is rear view of the invented bulk loader in the standby position.
Figure 3:
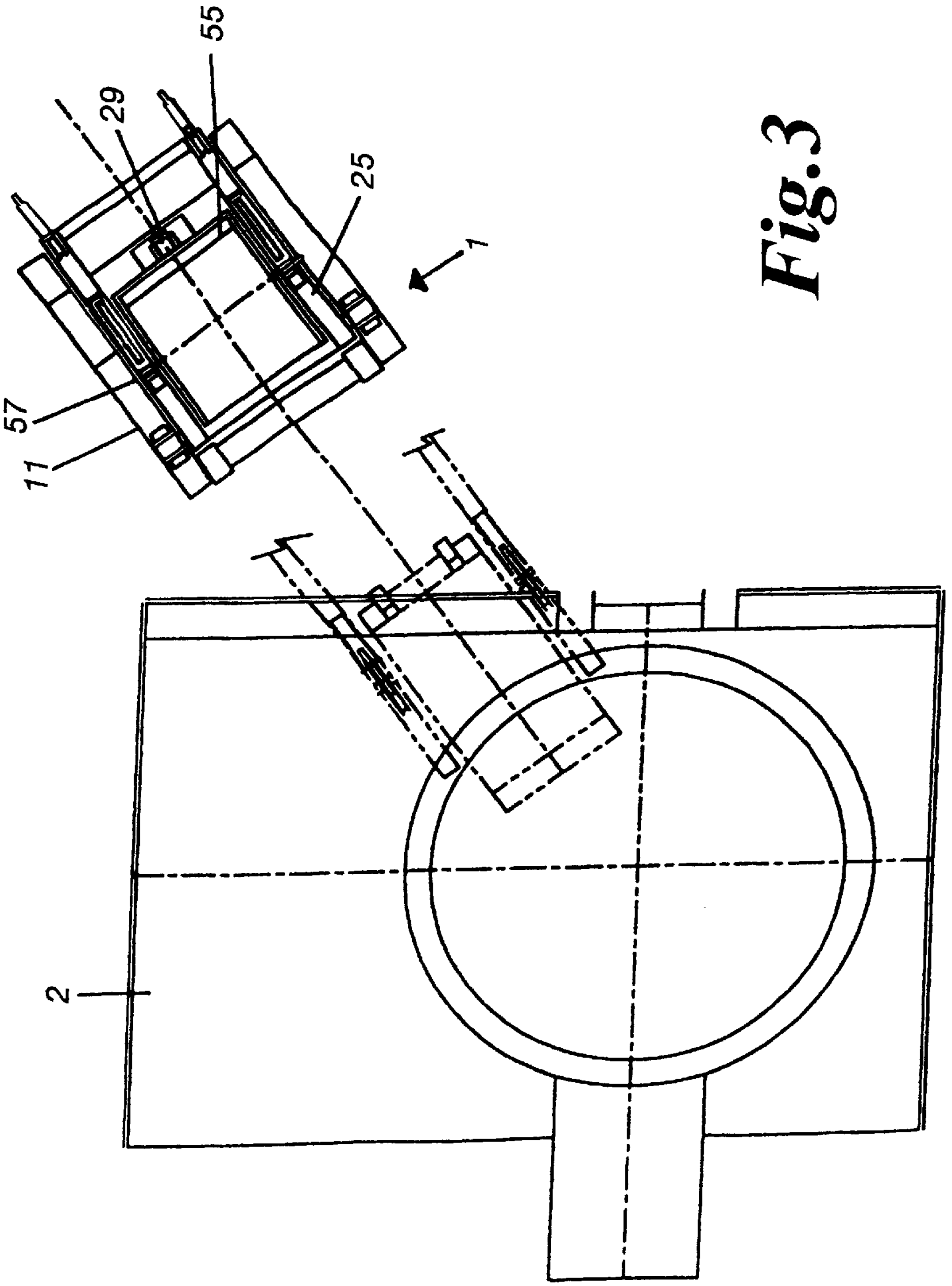
FIG. 3 is a top view of the invented bulk loader in the standby position and in the charging position over an electric furnace.
Figure 4:
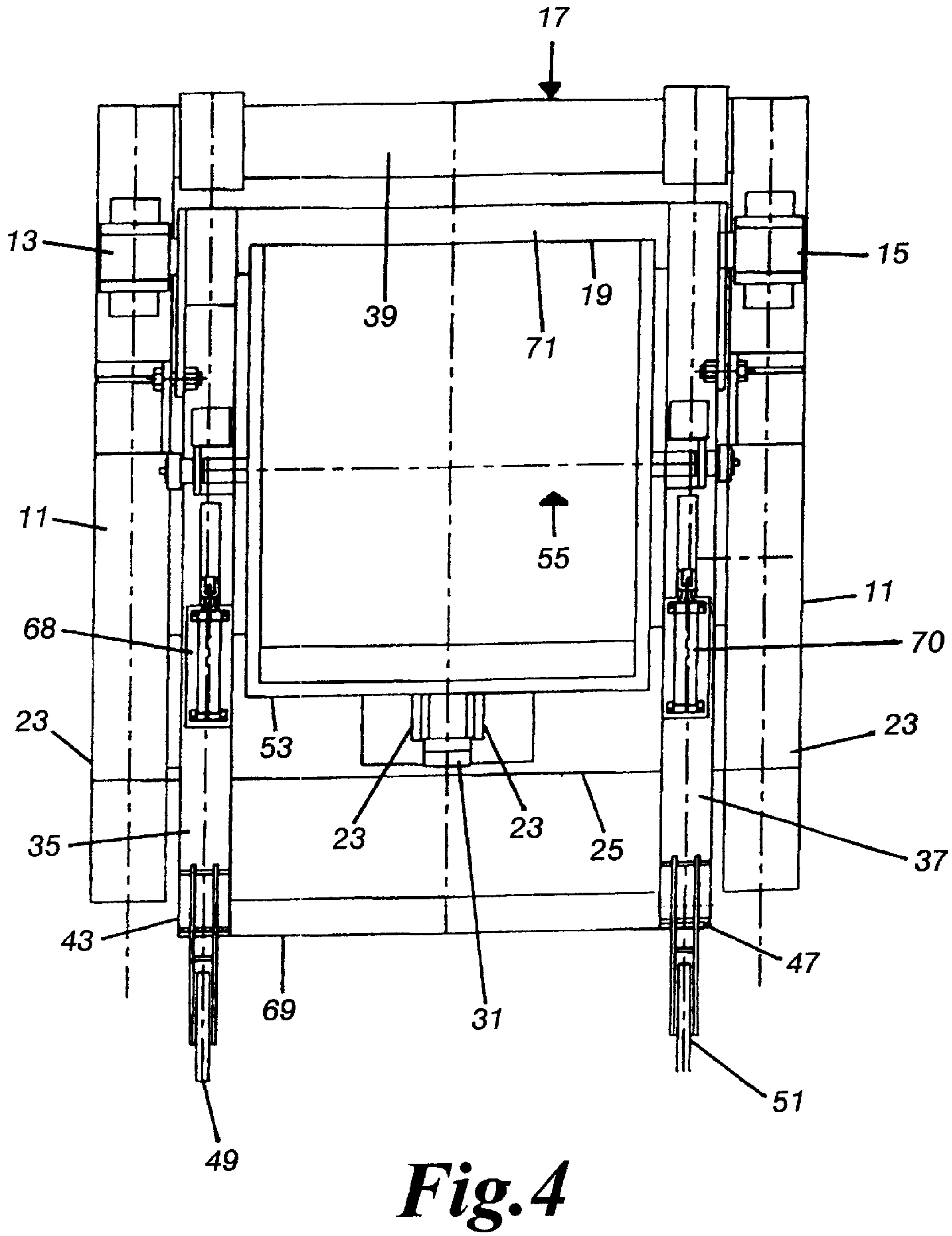
FIG. 4 is a detailed top view of the invented bulk loader in the standby position.

Referring generally to FIGS. 1–4, the present invention is a bulk loader apparatus 1 for loading bulk material into an electric arc furnace 2 of the type having a removable roof. The invented bulk loader apparatus 1 includes a base 11 having a first bearing support 13 and a second bearing support 15 extending upward from the base 11. The bearing supports 13, 15 are positioned near a front end 17 of the base 11 proximate to the electric arc furnace 2, and the first bearing support 13 is positioned opposite the first bearing support 13. An elongated swing arm 19 is pivotally attached at a lower region 21 to the first and second bearing supports 13, 15.

The base 11 also has a U-shaped cylinder support frame 23 mounted near a rear end 25 of the base 11 so that the arms of the cylinder support frame 23 extend generally upward from the base 11. In a preferred embodiment of the present invention, each of the cylinder support frame arms has a first section extending perpendicularly from the base 11 and a second section angled toward the swing arm 19. Trunion caps 27 are located at distal ends 29 of the cylinder support frame arms. A hydraulic cylinder 31 is secured to the trunion caps 27.

On the other end of the hydraulic cylinder 31 opposite the connection with the trunion caps 27, the piston of the hydraulic cylinder 31 is attached to a central region 33 of the swing arm 19. In another preferred embodiment of the present invention, the hydraulic cylinder is oriented such that the piston is angled generally downward from the distal ends 29 of the cylinder support frame arms to the connection with the central region 33 of the swing arm 19. In a preferred embodiment, the hydraulic cylinder 31 moves the swing arm 19 from a nearly vertical standby position to a nearly horizontal charging position where the bulk material is delivered to the electric arc furnace 2. Naturally, additional hydraulic cylinders can be used to operate the swing arm 19. Furthermore, the rotation of the swing arm 19 can be modified to permit charging and loading at different positions.

The present invention can also accommodate a swing arm that can be rotated on a turret between a standby position and two or more charging positions. Consequently, the swing cradle can deliver bulk material to two or more EAFs.

A first perpendicular beam 35 and a second perpendicular beam 37 extend from a top region 39 of the swing arm 19 opposite the base 11. A first brace 41 is positioned between the swing arm 19 and a distal end 43 of the first perpendicular beam 35 and provides support to the first perpendicular beam 35. A second brace 45 is positioned between the swing arm 19 and a distal end 47 of the second perpendicular beam 37 and provides support to the second perpendicular beam 37.

A first pulley 49 is attached to the distal end 43 of the first perpendicular beam 35 opposite the first brace 41. A second pulley 51 is attached to the distal end 47 of the second perpendicular beam 37 opposite the second brace 45.

A swing cradle 53, or platform, is pivotally connected to the first and second perpendicular beams 35, 37. The swing cradle 53 has a yoke 57 on a lower end 58 of the cradle 53. A triangular shaped hopper 55 which is filled with bulk material is placed onto the swing cradle 53. The hopper 55 opens upward and comes to a point near the yoke 57 of the swing cradle 53. The hopper 55 is fixed with respect to the swing cradle 53. A front tie beam 67 and a rear tie beam 69 secure the hopper 55 in the swing cradle 53. In addition, a pair of hydraulic cylinders 68, 70 can be added to move the swing cradle 53 during operation.

A first static wire 59 attaches the yoke 57 of the swing cradle 53 to a first fixed support 61 attached to the base 11. The first static wire 59 runs over the first pulley 49. A second static wire 63 attaches the yoke 57 of the swing cradle 53 to a second fixed support 65 attached to the base 11. The second static wire 63 runs over the second pulley 51.

The first fixed support 61 is positioned between the cylinder support frame 23 and the first bearing support 13. The second fixed support 65 is positioned between the cylinder support frame 23 and the second bearing support 15.

As shown in FIG. 1, during rotation of the swing arm 19, the hopper 55 is oriented over the furnace 2. The pulleys 49, 51 and the static wires 59, 63 form a wire and pulley assembly, referred to generally as 50. As the swing arm 19 rotates from the standby position to the nearly horizontal charging position, the pulleys 49, 51 move away from the fixed supports 61, 65. Because the static wires 59, 63 have a fixed length, the yoke 57 of the swing cradle 53 is forced to rotate toward the pulleys 49, 51 thereby decreasing the angle the swing arm 19 must be rotated to empty the bulk material in the hopper 55 in to the electric arc furnace 2. Consequently, gravity discharges the bulk material from the hopper 55 into the furnace 2 without requiring excessive rotation of the swing arm 19. When the material is emptied from the hopper 55, the hydraulic cylinder 31 is energized in the reverse direction and returns the swing arm 19 to the standby position. As the swing arm 19 rotates back to the standby position, the wire and pulley assembly 50 allows the swing cradle 53 and hopper 55 to return to the standby position.

In operation, the charge hopper 55 is filled from large bulk bins and transported to a staging area to be picked up by material handling equipment (not shown). The material handling equipment places the hopper 55 onto the swing cradle 53. Then, the material handling equipment disengages from the hopper 55. While the furnace roof is open to receive the scrap metal charge, the hydraulic cylinder 31 is energized and pushes the swing arm 19 about a pivot point where the swing arm 19 is connected to the base 11.

In a preferred embodiment of the present invention, a base portion 71 of the lower region 21 of the swing arm 19 extends below the pivot connection of the swing arm 19 to the bearing supports 13, 15. The base portion 71 acts as a counterweight to stabilize the swing arm 19 and to assist in the return movement of the swing arm 19 to the standby position after the hopper 55 has been emptied. The material handling equipment will then engage the hopper 55, lift it from the swing cradle 53 and return it to the standby position placing the swing cradle 53 near a staging area for refill.

In one embodiment of the present invention, the base 11 of the bulk loader apparatus 1 has a base plate 10 that can be secured to existing plant structure. In another embodiment of the present invention, the base 11 provides sufficient support for the bulk loader apparatus 1 thereby allowing it to operate without being secured to existing plant structure.

One important features of the present invention is that the bucket portion of the loader has a cocked lifting bale.

SUMMARY OF THE ACHIEVEMENT OF THE OBJECTS OF THE INVENTION

The present invention eliminates the need for bagging bulk material, which reduces operating costs. This equates to significant annual savings over existing operations. The present invention also increases EAF utilization and provides savings in EAF bottom refractory. Furthermore, the present invention decreases the consumption of lime due to improved lime utilization in the refining process.

Finally, the present invention reduces the release of fugitive particles into the shop environment. As a consequence, the demand on pollution control equipment is reduced.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

What is claimed is:

1. An apparatus for precisely delivering bulk material into an open roof area of an electric arc furnace, comprising:
   - a base having a front end proximate to the electric arc furnace and a rear end opposite said front end;
   - a swing arm having a lower region pivotally mounted to said front end of said base and an upper region opposite said lower region;
   - a swing cradle pivotly mounted to said upper region of said swing arm;
   - a hopper positionable in said swing cradle;
   - means for swinging said swing arm between a standby position and at least one charging position such that when said swing arm is moved to the at least one charging position said swing cradle and said hopper are moved bodily over the open roof area of the electric arc furnace; and
   - means for tilting said swing cradle and said hopper between a loading position and an emptying position, said tilting means comprising a wire and pulley assembly comprising;
     - a yoke formed on a bottom of said swing cradle and a support positioned on said base;
     - a pulley extending from said swing cradle; and
     - a static wire connecting said yoke to said support and engaging said pulley;
     - wherein swinging said swing arm from the standby position to the at least one charging position causes said pulley to move further away from said support on said base thereby causing said swing cradle and said hopper to move toward said pulley which causes said swing cradle and said hopper to rotate sufficiently to precisely deliver material into the open roof area of the electric arc furnace;
   - said support further comprises:
     - a first support positioned on said base; and
     - a second support positioned on said base opposite said first support;
     - wherein said pulley further comprises a first pulley extending from said swing cradle and a second pulley extending from said swing cradle opposite said first pulley;
     - wherein said static wire further comprises a first static wire connecting said yoke to said first support and engaging said first pulley and a second static wire connecting said yoke to said second support and engaging said second pulley;
   - wherein said swinging means and said tilting means operate jointly to precisely deliver bulk material from the hopper through the open roof area of the electric arc furnace.

2. The apparatus of claim 1 wherein said base further comprises a base plate securable to existing plant structure.

3. The apparatus of claim 1 further comprising a support frame mounted on said rear end of said base for supporting said swinging means.

4. The apparatus of claim 1 wherein said swinging means is a main hydraulic cylinder having a casing mounted to trunion caps positioned in distal ends of said support frame and a reciprocating piston extending from said casing and connected to a central region of said swing arm.

5. The apparatus of claim 1 further comprising a pair of spaced bearing supports mounted near said front end of said base for pivotally mounting said swing arm to said base.

6. The apparatus of claim 1 wherein said swing arm further comprises a pair of spaced support beams extending generally perpendicularly from said top region of said swing arm and wherein said swing cradle is pivotally mounted between said support beams.

7. The apparatus of claim 1 wherein said swing cradle further comprises a pair of hydraulic cylinders for retaining said hopper in said swing cradle.

8. An apparatus for precisely delivering bulk material into an open roof area of an electric arc furnace, comprising:
   - a base having a front end proximate to the electric arc furnace and a rear end opposite said front end;
   - a swing arm having a lower region pivotally mounted to said front end of said base and an upper region opposite said lower region, said swing arm having a base portion extending below the connection of said swing arm to said base for acting as a counterweight to stabilize said swing arm and for assisting in the return movement of said swing arm to the standby position after bulk material has been emptied from said hopper;
   - a swing cradle pivotally mounted to said upper region of said swing arm;
   - a hopper positionable in said swing cradle;
   - means for swinging said swing arm between a standby position and at least one charging position such that when said swing arm is moved to the at least one charging position said swing cradle and said hopper are moved bodily over the open roof area of the electric arc furnace; and
   - means for tilting said swing cradle and said hopper between a loading position and an emptying position;
   - wherein said swinging means and said tilting means operate jointly to precisely deliver bulk material from the hopper through the open roof area of the electric arc furnace.

9. The apparatus of claim 8 wherein said base further comprises a base plate securable to existing plant structure.

10. The apparatus of claim 8 further comprising a support frame mounted on said rear end of said base for supporting said swinging means.

11. The apparatus of claim 10 wherein said swinging means is a main hydraulic cylinder having a casing mounted to trunion caps positioned in distal ends of said support frame and a reciprocating piston extending from said casing and connected to a central region of said swing arm.

12. The apparatus of claim 8 further comprising a pair of spaced bearing supports mounted near said front end of said base for pivotally mounting said swing arm to said base.

13. The apparatus of claim 8 wherein said swing arm further comprises a pair of spaced support beams extending generally perpendicularly from said top region of said swing arm and wherein said swing cradle is pivotally mounted between said support beams.

14. The apparatus of claim 8 wherein said swing cradle further comprises a pair of hydraulic cylinders for retaining said hopper in said swing cradle.

15. An apparatus for precisely delivering bulk material into an open roof area of an electric arc furnace, comprising:

a base having a front end proximate to the electric arc furnace and a rear end opposite said front end;

said base having a turret mounted to said front end of said base and a support frame mounted to said rear end of said base;

a swing arm having a lower region pivotally mounted to said turret and an upper region opposite said lower region;

a pair of spaced support beams extending generally perpendicularly from said upper region of said swing arm;

a swing cradle pivotally mounted to said support beams;

a hopper positionable in said swing cradle; and a main hydraulic cylinder mounted on distal ends of said support frame for rotating said swing arm around a first axis point between a standby position and at least one charging position such that when said swing arm is moved to the at least one charging position said swing cradle and said hopper are moved bodily over the open roof area of the electric arc furnace; and a wire and pulley assembly for tilting said hopper and said swing cradle about a second axis between a loading position and an emptying position, said wire and pulley assembly comprising;

a yoke formed on a bottom of said swing cradle and a pair of spaced supports positioned on said base;

a first pulley extending from a distal end of said first support beam;

a second pulley extending from a distal end of said second support beam;

a first static wire extending from said yoke to said first support and engaging said first pulley;

a second static wire extending from said yoke to said second support and engaging said second pulley;

wherein rotating said swing arm to the at least one charging position causes said pulleys to move further away from said supports on said base thereby causing said bottom of said swing cradle to move toward said pulleys and causing said swing cradle and said hopper to rotate sufficiently to precisely deliver bulk material from said hopper through the open roof area of the electric arc furnace;

wherein said main hydraulic cylinder and said wire and pulley assembly operate jointly to precisely deliver bulk material from said hopper through the open roof area of the electric arc furnace.

16. The apparatus of claim 15 wherein said base further comprises a base plate securable to existing plant structure.

17. A method of charging an electric arc furnace comprising the steps of:

providing a bulk loader having a base, a swing arm secured to said base, a swing cradle mounted on said swing arm opposite said base, a hopper positionable in said swing cradle, a wire and pulley assembly, and a main hydraulic cylinder mounted on said base and connected to said swing arm;

positioning said swing arm in a standby position;

positioning a hopper filled with bulk material on said swing cradle;

securing said hopper to said swing cradle with a front tie beam and a rear tie beam;

activating said main hydraulic cylinder;

rotating said swing arm about a first axis point from a standby position to a charging position where said hopper and said swing cradle are positioned over an open roof area of the electric arc furnace;

simultaneously rotating said swing cradle about a second axis point with said wire and pulley assembly;

precisely delivering bulk material from said hopper through the open roof area of the electric arc furnace; and using a base portion of said swing arm located below said first axis as a counterweight for returning said swing arm from the charging position to the standby position.

18. The method of claim 17 further comprising the steps of:

activating said main hydraulic cylinder in a reverse direction;

rotating said swing arm about said first axis point from the charging position to the standby position;

simultaneously rotating said swing cradle back around said second axis point with said wire and pulley assembly;

releasing said empty hopper from said swing cradle; and removing said empty hopper from said cradle.

* * * * *